May 8, 1956  L. FEIGIN  2,744,416

DIFFERENTIAL STOP MECHANISM

Filed Nov. 10, 1953

INVENTOR.
Leon Feigin

BY Leonard H. King
AGENT

United States Patent Office 2,744,416
Patented May 8, 1956

1

2,744,416

DIFFERENTIAL STOP MECHANISM

Leon Feigin, Queens, N. Y., assignor to Aviation Engineering Division, Avien-Knickerbocker, Inc., Woodside, N. Y.

Application November 10, 1953, Serial No. 391,158

1 Claim. (Cl. 74—414)

This invention relates to stops for rotating gear mechanisms and in particular to such mechanisms permitting over 360° gear rotation prior to stop engagement.

In a typical mechanism utilizing a gear train such as an electrically operated timing device, a motor operating at a relatively high R. P. M., 3600 R. P. M. being a common speed, is geared down by means of a gear train to a much lower speed, such as 1 R. P. M., at the output shaft. Accordingly, at the output shaft there is available low speed but extremely high torque. If such a mechanism is utilized in a fuel quantity indicator wherein the output shaft is required to make less than one revolution in conformance with a dial, it is conventional to provide a stop to prevent the indicator from completing more than one revolution of the dial.

One prior art stop comprises a simple fixed pin arranged to engage a spur extending from the shaft. However, this proves unsatisfactory if the stop is at the end of the gear train where the necessary restrictions of movement of less than one revolution is met because of the high torque provided by the gear train at that point. This is true even if a low horsepower motor is used because of the 3600:1 torque ratio present. If more than one revolution is desired at the output shaft, a simple interference stop cannot be used. Obviously such a stop could not be placed at the input of the gear train where a relatively light torque is present nor is it practical for the same reasons to place such a stop at an intermediate portion of the gear train.

Other prior art approaches have been to use washer having extending lugs which are piled up one atop the other so that at the completion of a revolution, an additional lug becomes engaged. The cycle repeating until the entire mechanism becomes engaged. This type of stop is objectionable because of friction contributed to the overall system by each washer disc used. Further, in order to accurately control the stopping angle, extremely close tolerance must be maintained for the widths of the lugs.

Other prior types of stops include lead screw stops which are expensive and consume considerable space. They are generally dependent on a traveling nut moving along a lead screw and present an interference to a rotating member after a prescribed number of revolutions. Such stops are expensive, occupy considerable space and are limited as to possible applications.

This invention provides a simple means of stopping a shaft bearing a gear which meshes with a second gear on an adjacent shaft. The second gear may be an idler gear or may be employed directly in the gear train.

This invention premits pre-determining the number of revolutions that the gear shall make before the stop is engaged. Thus it lends itself to incorporation at an intermediate point on the gear train as it permits a plurality of revolutions.

This invention may be more clearly understood by reference to the following description and accompanying drawings wherein like numbers refer to like members.

Figure 1:
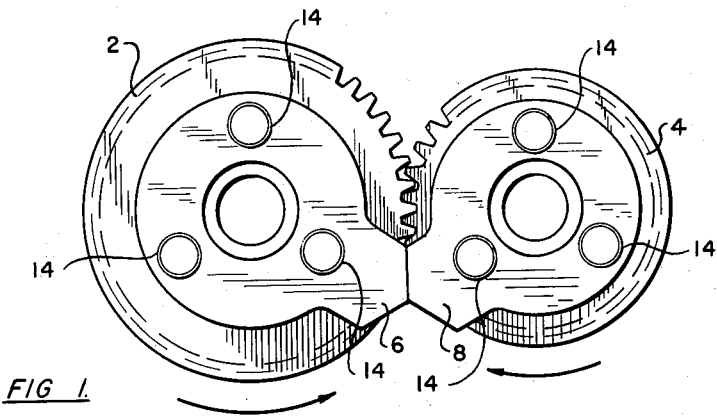
Figures 1 and 2 show the stop mechanism of this invention in alternate extreme engaged positions.

In Figure 1 there is shown a 48 tooth gear 2 which is in mesh with 41 tooth gear 4. The gears are provided with stops 6 and 8 respectively. The stops are shown in the engaged position which does not occur for the particular gear ratio and stop shown until five revolutions and 300° of revolution (2100° total) is completed by the gear 2.

Figure 2:
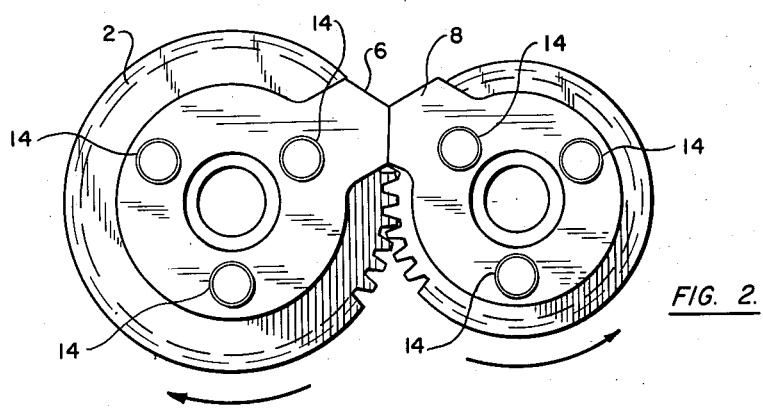

Figure 2 shows the same two gears being revolved in the other direction so that another stop is engaged.

Figure 3:
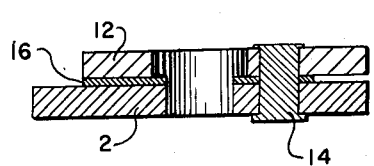
Figure 3 is a cross sectional view of the stop mechanism of this invention.

In Figure 3 a preferred construction for the stop is shown in cross section. Stop portion 12 is assembled to gear 2 by means of rivets 14. Washer spacer 16 is used to provide necessary clearance between the stop mechanism and the gear.

An important feature of this invention is the provision of a stop which when engaged transmits its force in a direction substantially through the shaft. Thus referring to the drawings, it may be seen that a substantial structural member is present to take the full thrust when the stop is engaged. Further, if the gears are mounted on light shafts, the shafts will act as shock absorbers by deflecting at the moment of impact.

The advantages of this invention are realized in applications wherein both gears make more than one revolution between stop positions. It is a requirement that the gear ratio not be an integer if both gears be able to make more than one revolution between stop positions. For purposes of illustration, assume a condition where stops of zero thickness are contacting each other along a common diameter which would represent the shortest pair of stops possible. If the ratio between gears is an integer such as 2, then after one revolution of the larger gear with reference to the starting position, an identical position to the starting position results without interference occurring. It may be seen that mere repetition of the cycle (i. e. additional revolutions) will not result in locking or if the stop thickness or length is increased, locking will occur at less than one revolution of the larger gear which would defeat the purposes of this invention.

Figure 4:
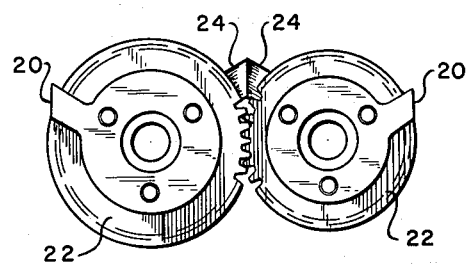
Figure 4 shows in plan an alternate stop mechanism of this invention.

In the preferred embodiment shown in the drawing, double-ended stops are used. However, two separate stops may be provided as shown in Figure 4 wherein stop portion 20 is located on top of gear 22 while stop 24 is provided on the bottom surface of the gear. This feature is useful if the rotation of the gears is to be limited to a range smaller than convenient to control by the width of the disclosed double stop.

In the drawings the stops 6 and 8 are shown as protruding an equal amount beyond the periphery of the gears 2 and 4. In practice one stop may be longer than the other and only one need actually extend beyond the edge of its supporting gear.

It is to be understood that although described and shown as applied to simple spur gears, the stop of this invention may also be applied to bevel and other types of gears and related mechanisms such as friction driven wheels and pulleys.

While I have described the currently best known embodiment of this invention, I wish it understood that many modifications may be made in the embodiment shown without departing from the spirit of the invention.

I claim as new:

A differential gear stop mechanism comprising a pair of meshing gears having a gear ratio other than an integer, a stop member formed of a flat plate affixed to each of said gears, each of said stop members being characterized by a pair of faces meeting at an obtuse angle, each of said faces being oriented to meet the corresponding face of said other stop on a line substantially at right angles to a line common to the center of each of said gears.

References Cited in the file of this patent

UNITED STATES PATENTS

| | | |
|---|---|---|
| 1,203,840 | Bailey | Nov. 7, 1916 |
| 2,599,934 | Opocensky | June 10, 1952 |
| 2,709,220 | Spector | May 24, 1955 |

FOREIGN PATENTS

| | | |
|---|---|---|
| 27,396 | Netherlands | June 16, 1932 |